United States Patent

Sedlacek et al.

[11] Patent Number: 6,139,267
[45] Date of Patent: Oct. 31, 2000

[54] FLUID MACHINE

[76] Inventors: Miroslav Sedlacek, Pruchova 58, 150 00 Praha 5, Czech Rep.; Stanislav Hostin, Mlynarovicova 11, 851 03 Bratislava, Slovakia

[21] Appl. No.: 09/284,696
[22] PCT Filed: Oct. 8, 1997
[86] PCT No.: PCT/CZ97/00034
    § 371 Date: May 10, 1999
    § 102(e) Date: May 10, 1999
[87] PCT Pub. No.: WO98/17910
    PCT Pub. Date: Apr. 30, 1998

[30] Foreign Application Priority Data

Oct. 17, 1996 [CZ] Czech Rep. ............ 3045-96
Mar. 28, 1997 [CZ] Czech Rep. ............ 972-97

[51] Int. Cl.⁷ .................................. F03B 3/00
[52] U.S. Cl. ............ 415/219.1; 415/90; 415/221; 415/223; 415/229
[58] Field of Search ................ 415/90, 170.1, 415/229, 203, 216.1, 219.1, 223, 221; 416/4; 290/54, 1 R

[56] References Cited

U.S. PATENT DOCUMENTS 2,030,560  2/1936  Adams, Jr. .
2,998,099  8/1961  Hollingsworth .
4,218,177  8/1980  Robel ................................ 415/90
4,367,413  1/1983  Nair .
4,531,887  7/1985  Klepesch .
4,629,395  12/1986 Mohsin ............................. 415/75
5,248,896  9/1993  Forrest .

FOREIGN PATENT DOCUMENTS

349274   5/1931   European Pat. Off. .
542461   8/1922   France .
4425294  2/1996   Germany .
941665   7/1982   Russian Federation .
1701971  12/1991  U.S.S.R. .
2195717  4/1988   United Kingdom .

Primary Examiner—Edward K. Look
Assistant Examiner—Ninh Nguyen
Attorney, Agent, or Firm—Hovey, Williams, Timmons & Collins

[57] ABSTRACT

A fluid machine comprising a fluid storage tank (1), provided with an inlet (2) and at least with one outlet nozzle (3), and in the area of the outlet nozzle (3) there is mounted, on a holding device (4), at least one rolling rotor (5) represented by a body of a rotary shape.

15 Claims, 8 Drawing Sheets

FLUID MACHINE

BACKGROUND OF THE INVENTION

1. Field of the Invention

The invention relates to a fluid machine which consists of a fluid storage tank provided with an inlet and at least with one outlet nozzle.

2. Background Art

From the Author's Certificate No. 941 665 of the former USSR there is known a hydraulic motor which consists of a rectifying channel, in which a narrowing outlet is made. In the axis of the narrowing outlet there is mounted a spherical rotor on a shaft. The rotor is connected to a starting motor.

At putting into operation, first the shaft is made turning and in this way the spherical rotor as well. The fluid stream which, in the narrowing outlet, flows round the sphere, is made rotating in this way. The rotating fluid stream keeps then the spherical rotor in rotation due to the friction between the fluid and the surface of the spherical rotor. It is necessary to stress that the spherical rotor is not rolling over walls of the narrowing outlet in any regime.

A drawback of said embodiment resides in the fact that the hydraulic motor cannot be put into operation without an auxiliary starting motor.

From another Author's Certificate No. 1701971 of the former USSR there is known an analogous hydraulic motor, where the starting motor is replaced with spiral blades mounted in the narrowing outlet.

As to said embodiment there is also not supposed that the rotor is to roll over the wall of the narrowing outlet.

In the practice there was shown that the flowing round the described type of the rotor causes unnecessary losses. That was why a more suitable embodiment of a fluid machine of a higher efficiency was in search.

SUMMARY OF THE INVENTION

The mentioned aim was achieved by means of a fluid machine comprising of a fluid tank provided with an inlet and at least with one outlet nozzle according to this invention, the principle of which resides in the fact that in the flow area of the outlet nozzle there is mounted, on the holding device, at least one rolling rotor represented by a body of a rotary shape.

The rolling fluid machine according to the invention makes it possible to utilise efficiently the power of the streaming fluid which may be represented not only by a liquid, but also by gas and by mixtures of liquids and gases. A higher efficiency may be achieved especially by decreasing the resistance which arises when the rotor rolls in a fluid. The machine can work even with fluids which are very polluted with mechanical particles. Moreover an eventual exchange of worn parts is very easy.

To increase the efficiency, it is advantageous, if the rotor is separated by means of a plane of the largest diameter into two parts of different capacities, the first part of the rotor adjacent to the outlet nozzle is larger than the second rotor part which is reverse with respect to the outlet nozzle.

According to an advantageous embodiment, the capacity of the second part of the rotor may equal zero and at least a part of the surface of the first part of the rotor may be of a spherical shape.

According to another advantageous embodiment, the whole rotor may be of a spherical shape.

For a appropriate utilisation of the streaming medium, it is advantageous, if the holding device consists of an area of bearing, arranged in the outlet nozzle behind the rotor, or if the holding device consists of a shaft pivoted in a frame and holding the rotor in the axis of the outlet nozzle, and the shaft is flexible at least in a definite section.

According to another advantageous embodiment, the holding device consists of a crankshaft pivoted in a frame and holding the rotor outside the axis of the outlet nozzle.

For an easy transfer of gained power, it is advantageous, if the rotor is provided with magnets, opposite which, in the outlet nozzle, there are mounted magnetic coils, or vice versa, the rotor is provided with magnetic coils, opposite which, in the outlet nozzle, there are mounted magnets, eventually the rotor is represented by a upstream tubular-bulb type turbine with embodying generator.

In some embodiments it may be advantageous, from the kinematic point of view, to change the function of the machine, so that the rotor is mounted in a non-rotary way and the outlet nozzle is mounted in a sliding way in the plane being perpendicular to the direction of flow.

To create a pump, it is advantageous, if the rotor and a driving unit are interconnected.

BRIEF DESCRIPTION OF DRAWINGS

The fluid machine according to the invention will be described in details by means of drawings, in which individual figures illustrate.

DESCRIPTION OF THE PREFERRED EMBODIMENT

Figure 1:
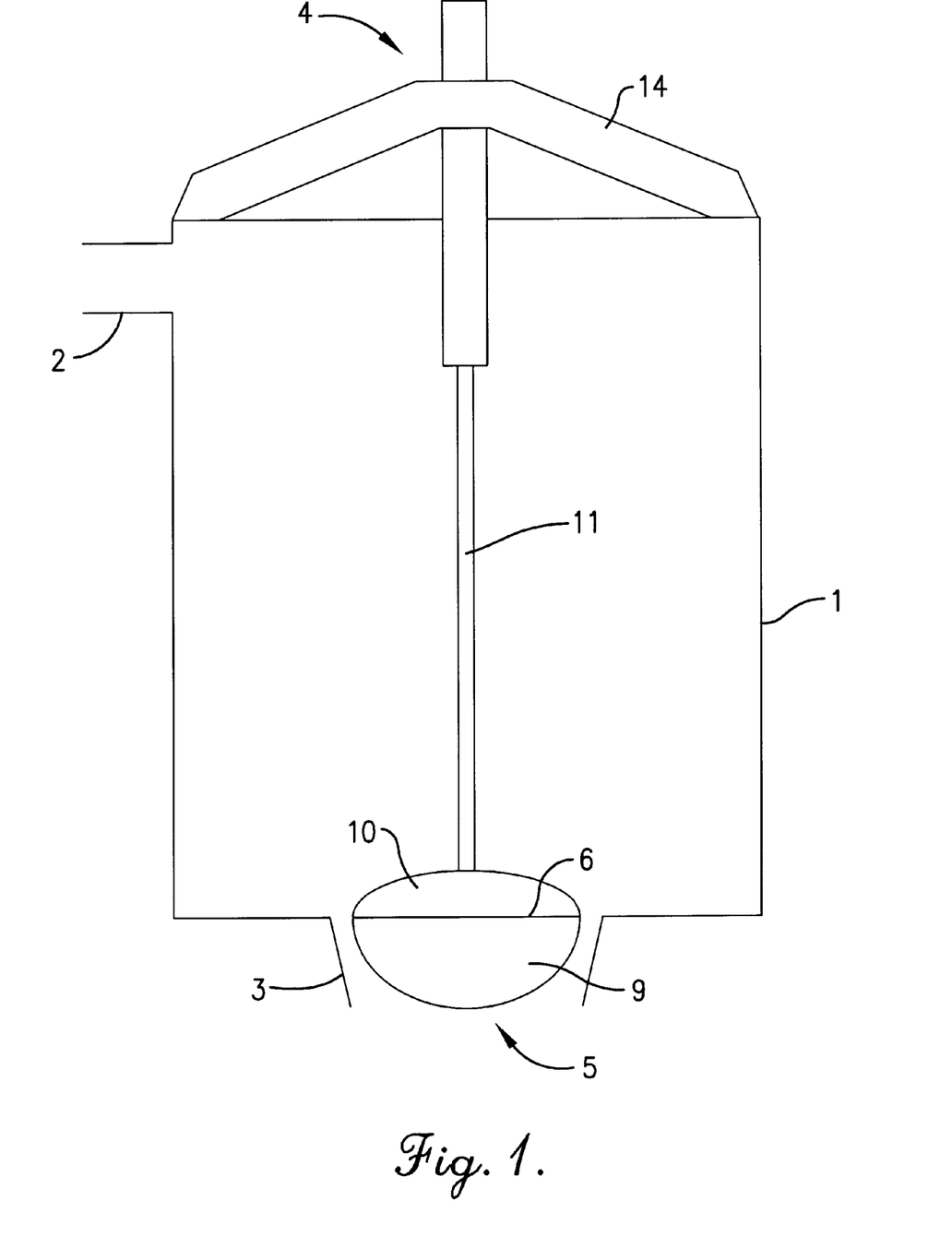
FIG. 1—an example of an embodiment of the fluid machine according to the invention FIG. 2—an example of an embodiment of the rotor FIG. 3—another example of the embodiment of the rotor FIG. 4—another example of the embodiment of the fluid machine according to the invention FIG. 5—another example of the embodiment of the fluid machine according to the invention FIG. 6—another example of the embodiment of the fluid machine according to the invention FIG. 7—another example of the embodiment of the fluid machine according to the invention adapted for gaining electric power FIG. 8—another example of the embodiment of the fluid machine for obtaining electric power FIG. 9—another example of the embodiment of the fluid machine for gaining electric power FIG. 10—the fluid machine installed in a free stream FIG. 11—the fluid machine installed in a piping FIG. 12—the fluid machine functioning as a pump FIG. 13—an example of an embodiment of the fluid machine according to the invention with a spherical rotor.
Figure 13:
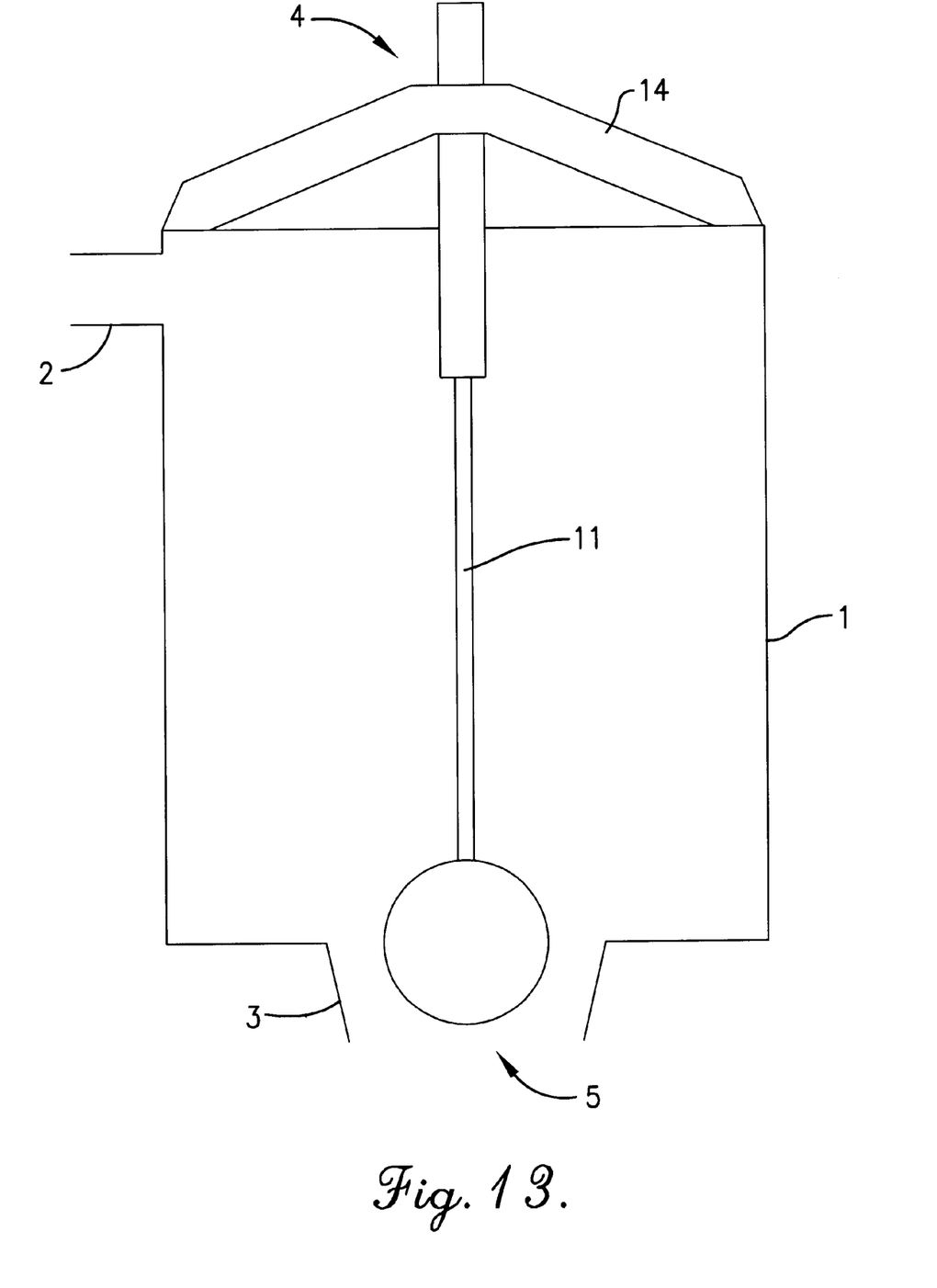

The fluid machine as in FIG. 1 consists of a metal storage tank 1 of water, provided in its upper part with an inlet 2 and in its lower part with an outlet nozzle 3 in the shape of a narrowing outlet. Onto the upper edge of the storage tank 1 there is fixed a frame 14, in which there is pivoted a shaft 11, the lower section of which is elastic. In the level of the outlet nozzle 3 there is mounted, on the shaft 11, a rotor 5 made of plastics. The rotor 5 is represented by a rotary body, the capacity of which is separated by the plane 6 of the largest diameter into two parts. The first part 9 of the rotor 5, arranged under the plane 6, is of a larger capacity than the second part 10 of the rotor 5. FIG. 13 shows an analogous embodiment which differs only in the shape of the rotor 5 which is spherical in this case.

Water supplied into the storage tank 1 through the inlet 2 streams from the storage tank 1 through the outlet nozzle 3, and the stream of the flowing away water causes that the rotor 5 starts to roll in a circular motion along the walls of the outlet nozzle 3. The rolling of the rotor 5 along the inner wall of the outlet nozzle 3 is made possible by the flexible part of the shaft 11. The rotary motion of the rotor 5 can be utilised for driving various tools, or it may be transferred by means of the shaft 11, e.g. to an unshown generator of electric power.

Figure 5:
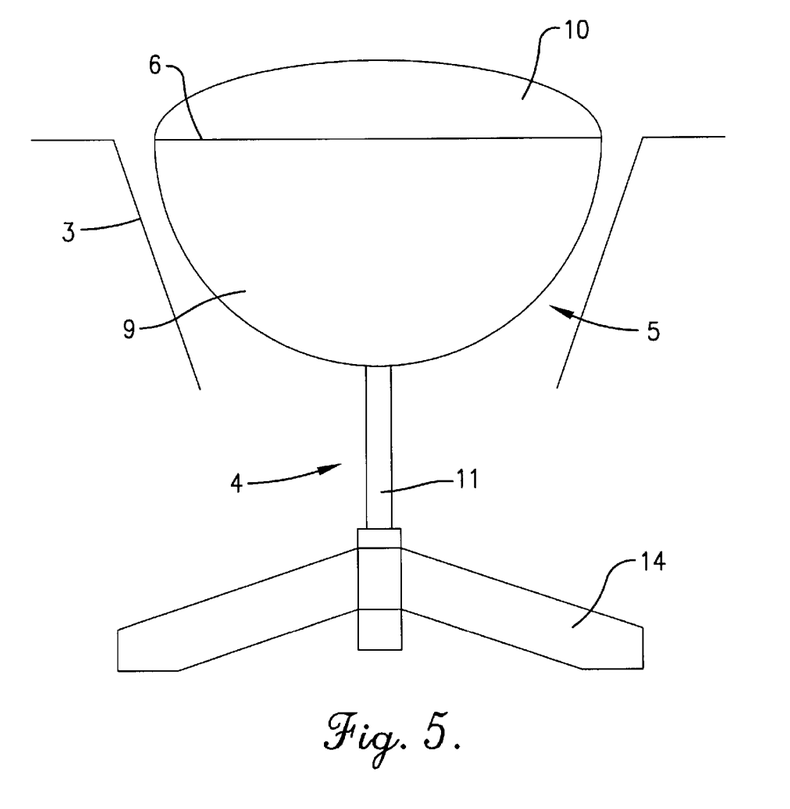

Of course, the holding device 4 may be installed also under the rotor 5, as it is shown in FIG. 5. The function of this embodiment is the same as the function of the above mentioned embodiment.

Figure 2:
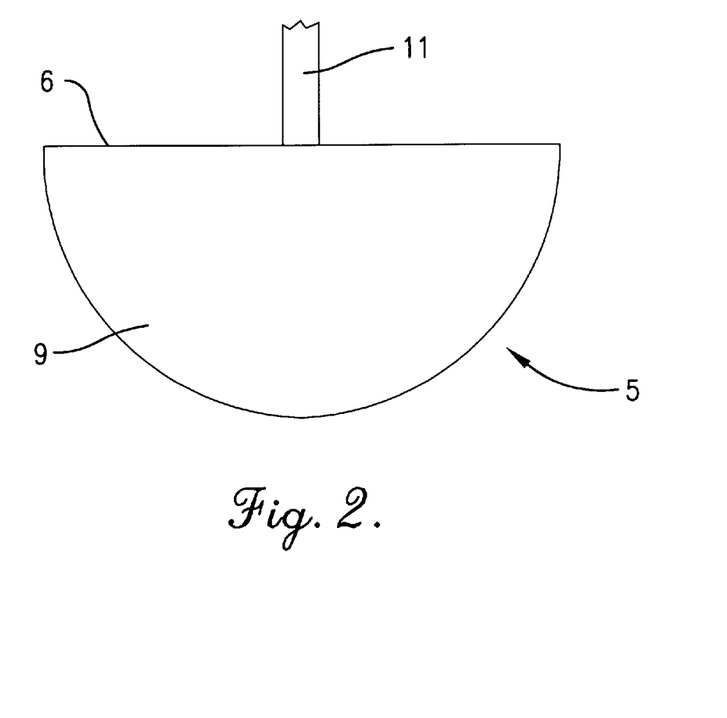

The maximum efficiency is achieved, if the capacity of the second part 10 of the rotor 5, above the plane 6 of the largest diameter, approximates to zero. The ideal example of the embodiment is illustrated in FIG. 2, according to which the rotor 5 is represented by a hemisphere, so that the capacity of the second part 10 over the plane of the largest diameter equals zero.

Figure 3:
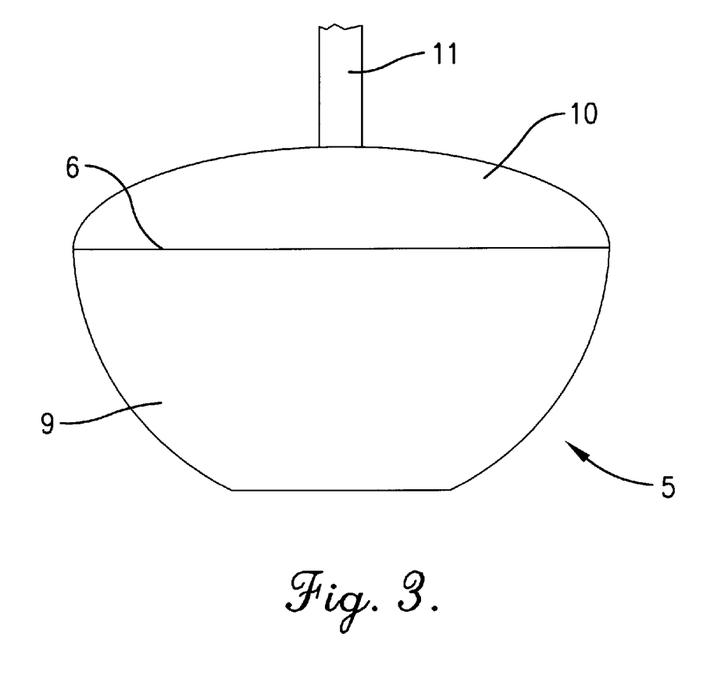

The first part 9 of the rotor 5 which is adjacent to the outlet nozzle 3, need not be, of course, in the shape of a hemisphere. In FIG. 3 there is shown the shape of a spherical segment. Generally, it would be sufficient that it concerns a rotary body, e.g. an ellipsoid. The second part 10 of the rotor 5, according to FIG. 3, is represented by a part of the ellipsoid. The capacity of said second part 10 of the rotor is considerably smaller than the capacity of the first part 9. Of course, the rotor 5 may be the hollow one.

Figure 4:
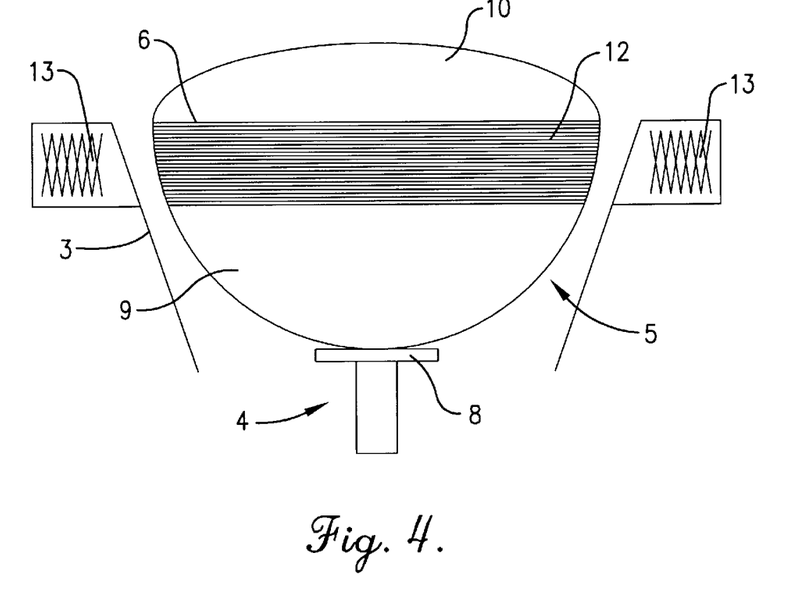

In FIG. 4 there is shown an example of the embodiment of the fluid machine, the holding device 4 of which consists of the area 8 of bearing which is fixed in the outlet nozzle 3 behind the rotor 5 with respect to the stream direction. The first part 9 of the rotor 5, made of plastic, is of the hemispherical shape and the second part 10 is of the shape of a part of the ellipsoid.

The rotor 5 is mounted onto the area 8 of bearing in a free way, so that it rolls over walls of the outlet nozzle 3, if the fluid passes through the outlet nozzle 3. The above described shape of the rotor 5 guarantees that the rotor 5 is orientated permanently by its first part 9 of the larger volume towards the outlet nozzle 3.

The area 8 of bearing may be readjusted as to its height by means of an readjusting device, not shown in the figure.

One of the possibilities how to utilise power obtained in such a way resides in mounting a system of magnets 12 into the rotor 5, and then, at their level, to mount a system of magnetic coils 13 in the wall of the outlet nozzle 3.

Rolling of the rotor 5 creates a relative motion between magnets 12 and coils 13, which results in inducing electric current.

Figure 6:
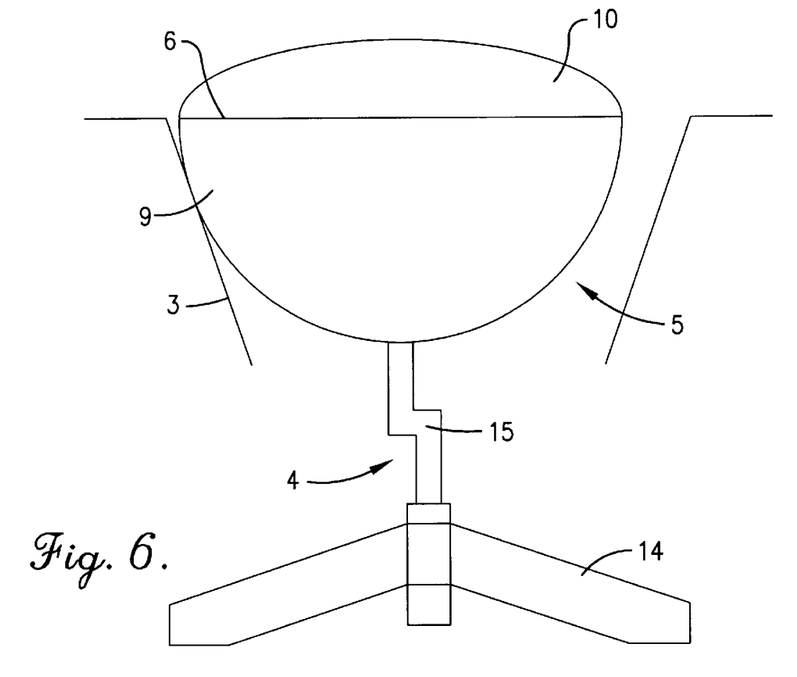

FIG. 6 shows the embodiment of the fluid machine according to the invention, the rotor 5 of which is carried by a crankshaft 15. The crankshaft 15 is pivoted in a frame 14, the centre of which is identical with the axis of the outlet nozzle 3. The frame 14 may be arranged either under the outlet nozzle 3 (as it is shown in FIG. 6), or over the outlet nozzle 3 (analogously as in the embodiment in FIG. 1). On the crankshaft 15 there is pivoted the rotor 5. The crank length of the crankshaft 15 is selected so that the rotor 5 may be in contact with the wall of the outlet nozzle 3, along which it rolls powered by the fluid stream, flowing through the outlet nozzle 3. The torque, acting on the crankshaft 15, can be utilised e.g. for driving a generator of electric current.

Figure 7:
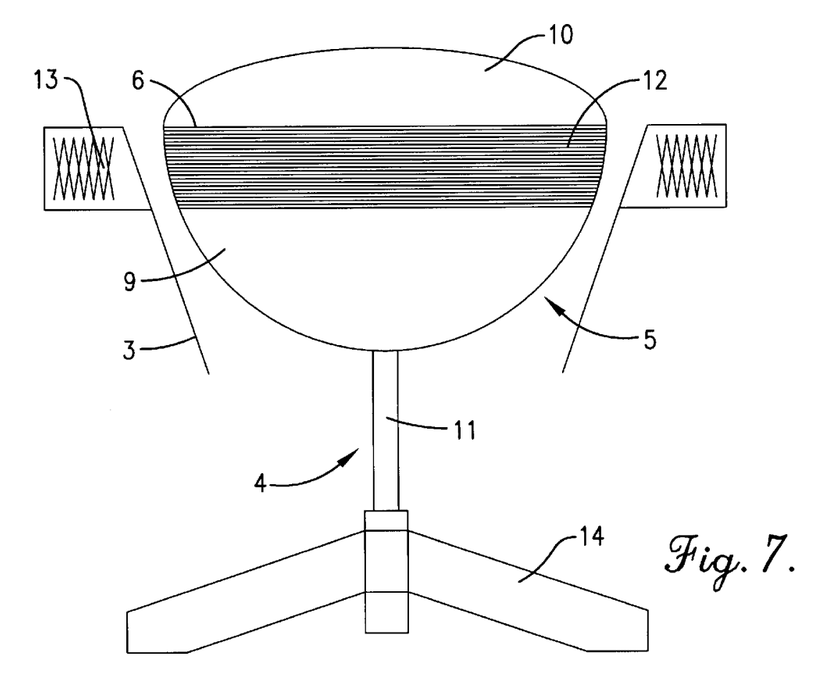

The gained power can be also utilised according to the embodiment shown in FIG. 7 (analogously as in the embodiment shown in FIG. 4) in such a way that the rotor 5 is provided with a system of the magnets 12, at the level of which, in the wall of the outlet nozzle 3, there are mounted magnetic coils 13, in which electric current is induced due to the rolling of the rotor 5.

Figure 8:
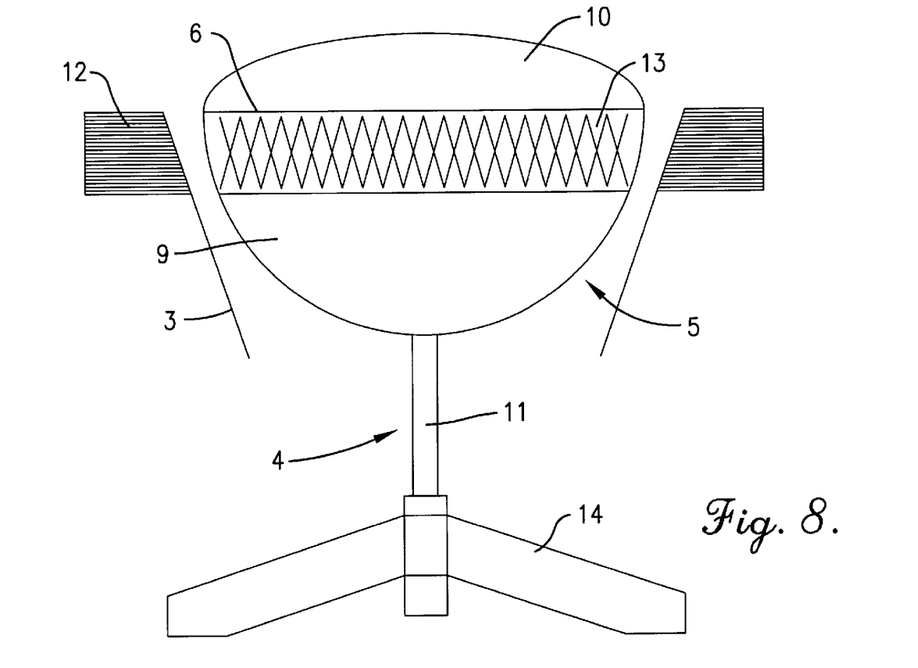

FIG. 8 shows the embodiment analogous to the embodiment as in FIG. 7, but with the difference that the positions of the magnets 12 and of the coils 13 were mutually exchanged, so that the induced electric current is taken from the rotor 5.

Figure 9:
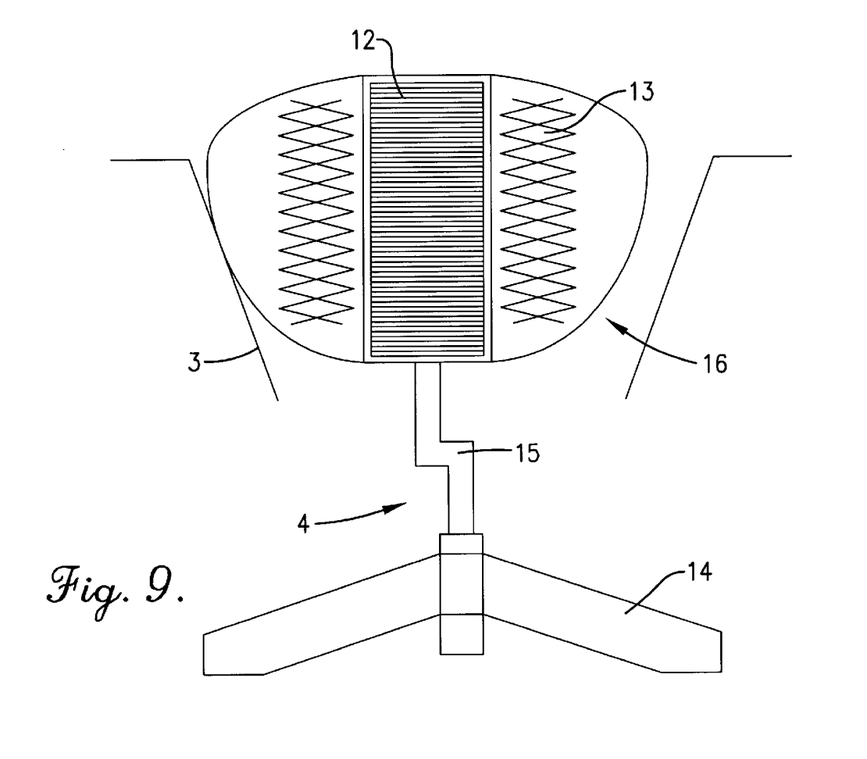

FIG. 9 shows the embodiment of the fluid machine analogous to the embodiment as in FIG. 6. The rotor 5 of the embodiment in FIG. 9 is represented by a so called flowed-round generator 16, the magnetic coils 13 of which, as well as the magnets 12, are mounted in the rotor 5. A quicker relative motion between the coils 13 and the magnets 12 can be achieved e.g. by means of an unshown epicyclic gear.

Figure 10:
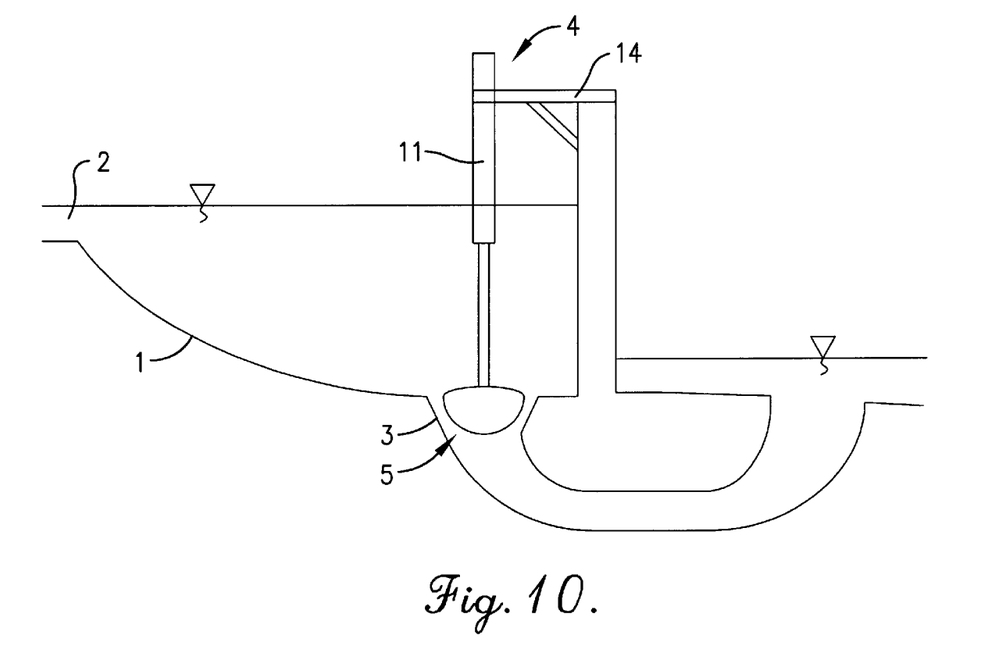

The storage tank 1 of all above mentioned embodiments of the fluid machine according to the invention need not be represented only by a tank. Said storage tank 1 may be made e.g. by damming a stream of a river or of a brook, as it is shown in FIG. 10.

Figure 11:
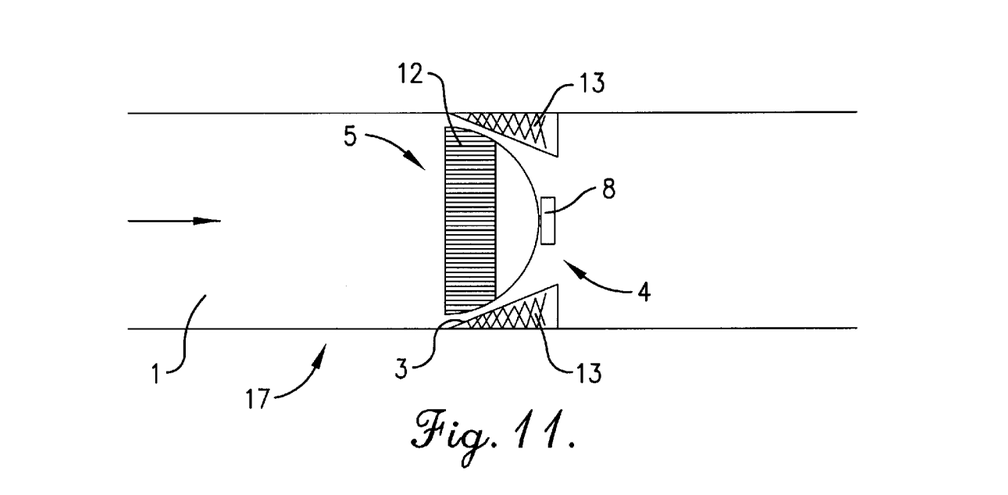

The storage tank 1 can be also represented e.g. by a part of a water-piping 17, as it is shown in FIG. 11. The water stream direction in the piping 17 is indicated by means of an arrow. The water stream in the piping 17 makes the rotor 5 rotating in the same way as in the above mentioned embodiments. At the same time, the water stream presses the rotor 5 to the area 8 of bearing. Electric current is induced in the magnetic coils 13 in the same way as in the above mentioned examples of embodiment.

As to the example of embodiment shown in FIG. 11, it is evident, that the fluid machine according to the invention may work not only in an approximately vertical position of the axis of the outlet nozzle 3, as it is at a liquid gravitation outflow, but the axis of the outlet nozzle 3 can be orientated arbitrarily, if the fluid is supplied to the outlet nozzle 3 under a sufficient pressure.

The fluid need not be only a liquid, but the machine is functional even if the medium is represented by gas, eventually by a mixture of gases and liquids. The described examples show that the machine according to the invention can work as a source of a torque and as a generator of electric current.

Figure 12:
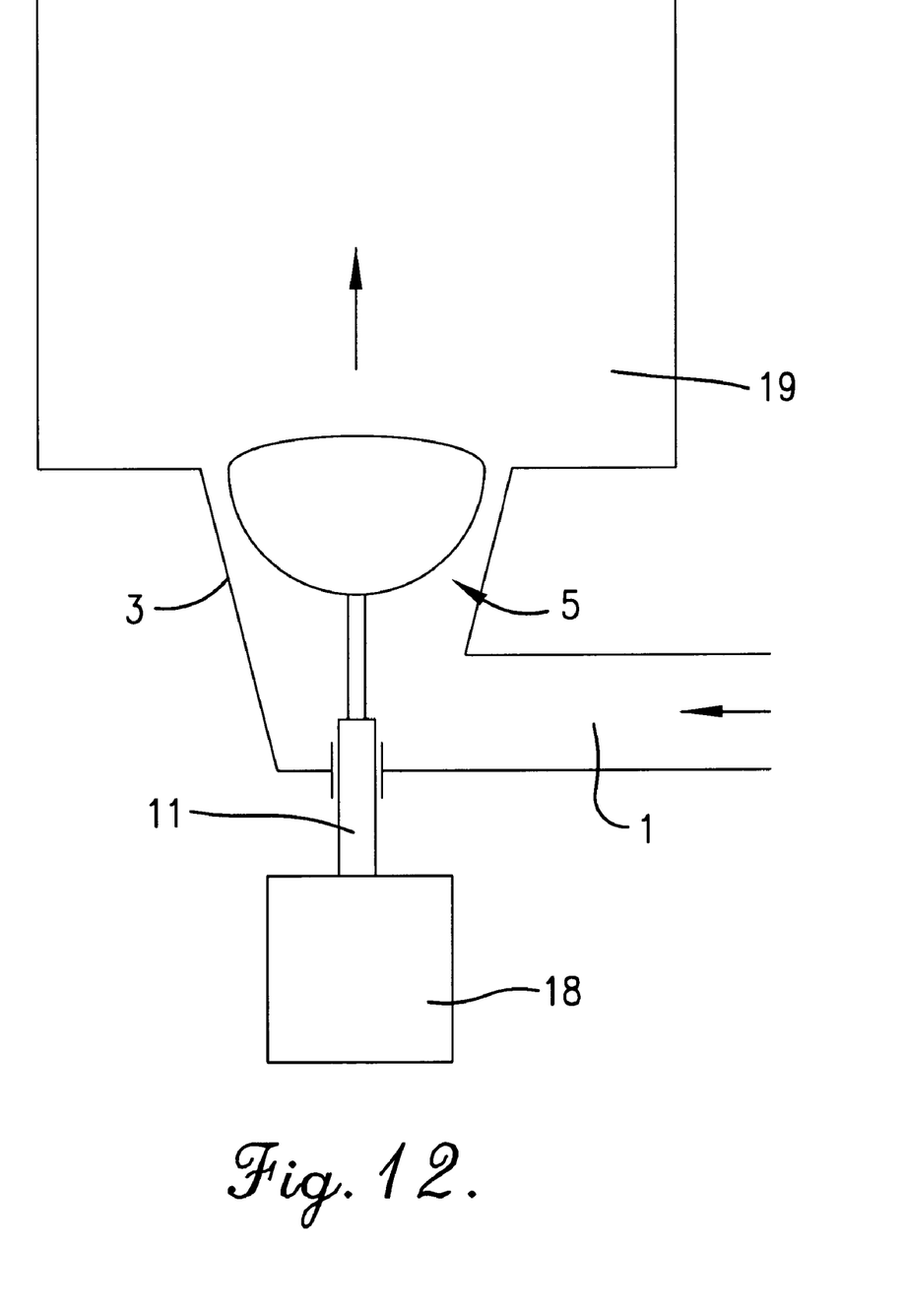

This machine, though, can also work as a pump. An example of such an embodiment is shown in FIG. 12. To the shaft 11 there is connected a driving unit 18 which can be an electric motor which drives, by means of the shaft 11, the rotor 5. A part of the shaft 11 is flexible, so when the rotor 5 is rotating, it starts to roll over the wall of the outlet nozzle 3 and in this way the fluid is pumped from the storage tank 1 into a space 19. The driving unit 18 may be represented by an arbitrary motor, eventually by a manual drive with an appropriate gearing mechanism.

Of course, an expert could adapt the fluid machine according to the invention in such a way that the rotor 5 is fixed and the outlet nozzle 3 rolls. As to such an embodiment the nozzle must be mounted in a sliding way in the plane being perpendicular to the direction of flow.

What is claimed is:

1. A fluid machine comprising:

a fluid storage tank provided with an inlet;

a holding device; and at least with one outlet nozzle, wherein that in the flow area of the outlet nozzle there is mounted, on the holding device, in a manner enabling free rolling along with the inner wall of the outlet nozzle, at least one rolling rotor represented by a body of a rotary shape.

2. The fluid machine according to claim 1, wherein the rotor has a volume, the volume of the rotor is separated by a plane through the largest diameter into two parts of different capacities, the first part of the rotor adjacent to the outlet nozzle is larger than the second part of the rotor, reverse with respect to the outlet nozzle.

3. The fluid machine according to claim 2, wherein the volume of the second part of the rotor reverse with respect to the outlet nozzle, equals zero.

4. The fluid machine according to claim 2, wherein at least apart of the surface of the first part of the rotor adjacent to the outlet nozzle, is of a spherical shape.

5. The fluid machine according to claim 1, wherein the rotor is of a spherical shape.

6. The fluid machine according to claim 1, wherein the holding device comprises an area of bearing, arranged in the outlet nozzle behind the rotor.

7. The fluid machine according to claim 1, wherein the holding device comprises a shaft pivoted in a frame and holding the rotor in the axis of the outlet nozzle, and the shaft is flexible at least in a definite section.

8. The fluid machine according to claim 1, wherein the holding device comprises a crankshaft pivoted in the frame and holding the rotor outside the axis of the outlet nozzle.

9. The fluid machine according to claim 1, wherein the rotor is provided with magnets, opposite which, in the outlet nozzle, there are mounted magnetic coils.

10. The fluid machine according to claim 1, wherein the rotor is provided with the magnetic coils, opposite which, in the outlet nozzle, there are mounted the magnets.

11. The fluid machine according to claim 1, wherein the rotor includes an upstream tubular-bulb type turbine with embodying generator.

12. The fluid machine according to claim 1, wherein the rotor is mounted in a non-rotary way and the outlet nozzle is mounted in a sliding way in the plane being perpendicular to the passage direction.

13. The fluid machine according to claim 1, wherein the rotor is interconnected with a driving unit.

14. The fluid machine according to claim 1, wherein the rotor has a volume, the volume of the rotor is separated by a plane through the largest diameter into two parts of different capacities, the first part of the rotor adjacent to the outlet nozzle is larger than the second part of the rotor, the second part of the rotor being positioned remotely to the outlet nozzle with respect to the first part of the rotor.

15. The fluid machine according to claim 14, wherein the volume of the second part of the rotor remotely positioned with respect to the outlet nozzle, equals zero.

* * * * *